United States Patent [19]

Yasuki et al.

[11] Patent Number: 5,061,998
[45] Date of Patent: Oct. 29, 1991

[54] ARRANGEMENT FOR PERMITTING MULTIPLEXING OF AN ADDITIONAL SIGNAL ON AN ENTIRE PORTION OF AN OVERSCANNING AREA OF A TELEVISION SIGNAL

[75] Inventors: Seijiro Yasuki, Yokohama; Kiyoyuki Kawai, Yokosuka, both of Japan

[73] Assignee: Kabushiki Kaisha Toshiba, Kawasaki, Japan

[21] Appl. No.: 531,757

[22] Filed: Jun. 1, 1990

[30] Foreign Application Priority Data

Jun. 7, 1989 [JP] Japan ................................. 1-144949

[51] Int. Cl.[5] ............................................ H04N 7/04
[52] U.S. Cl. ...................................... 358/142; 358/141
[58] Field of Search ................... 358/142, 141, 14, 15, 358/140

[56] References Cited

U.S. PATENT DOCUMENTS 3,700,793 10/1972 Borsuk et al. ....................... 358/142
3,842,196 10/1974 Loughlin ........................ 358/142 X
4,807,030 2/1989 Sacks ............................. 358/142 X

OTHER PUBLICATIONS

K. Kawai, S. Yasuki, N. Sakamoto, "A Wide Screen EDTV", IEEE Trans. on Consumer Electronics, vol. 35, No. 3, pp. 133-141, Aug. 1989.

M. A. Isnardi et al., "Encoding for Compatibility and Recoverability in the ACTV System", IEEE Trans. on Broadcasting, vol. BC-33, No. 4, pp. 116-123, Dec. 1987.

Primary Examiner—Victor R. Kostak
Attorney, Agent, or Firm—Oblon, Spivak, McClelland, Maier & Neustadt

[57] ABSTRACT

An additional signal multiplexing device is provided for multiplexing an additional signal on the vertical scanning area of a main signal as well as an additional signal separation device for separating the additional signal from the main signal on which the additional signal is multiplexed. In the additional signal multiplexing device, the main signal is output at a field repetition rate, and the additional signal is output at the field repetition rate after the phase of the additional signal is inverted for every other field, and the thus output signals are multiplexed on each other. In the additional signal separation device, the additional signal is separated by deriving the difference of the multiplexed signals between fields.

8 Claims, 10 Drawing Sheets

FIG. 7A

| LINE NUMBER | | OUTPUT OF SWITCH 13 | | LINE POSITION |
|---|---|---|---|---|
| $F_1$ | $F_2$ | $F_1$ | $F_2$ | |
| 22 | | A | | 1 |
| | 285 | | A | 2 |
| 23 | | A | | 3 |
| | 286 | | A | 4 |
| 24 | | A | | 5 |
| | 287 | | A | 6 |
| 25 | | A | | 7 |
| | 288 | | M−A | 8 |
| 26 | | M+A | | 9 |
| | 289 | | M−A | 10 |
| 27 | | M+A | | 11 |
| | 290 | | M−A | 12 |
| 28 | | M+A | | 13 |
| | 291 | | M−A | 14 |
| 29 | | M+A | | 15 |
| | 292 | | M−A | 16 |
| 30 | | M+A | | 17 |
| | 293 | | M−A | 18 |
| 31 | | M+A | | 19 |
| | 294 | | MAIN | 20 |
| 32 | | MAIN | | |

(UPPER END OF IMAGE PLANE → top; columns a1 a2 a3 a4 a5 a6)

FIG. 7B (columns a1 a2 a3 a4 a5 a6)

| | | | | | LINE POSITION |
|---|---|---|---|---|---|
| | 515 | | MAIN | | |
| 253 | | MAIN | | | 20 |
| | 516 | | M−A | | 19 |
| 254 | | M+A | | | 18 |
| | 517 | | M−A | | 17 |
| 255 | | M+A | | | 16 |
| | 518 | | M−A | | 15 |
| 256 | | M+A | | | 14 |
| | 519 | | M−A | | 13 |
| 257 | | M+A | | | 12 |
| | 520 | | M−A | | 11 |
| 258 | | M+A | | | 10 |
| | 521 | | M−A | | 9 |
| 259 | | M+A | | | 8 |
| | 522 | | A | | 7 |
| 260 | | A | | | 6 |
| | 523 | | A | | 5 |
| 261 | | A | | | 4 |
| | 524 | | A | | 3 |
| 262 | | A | | | 2 |
| | 525 | | A | | 1 |

(LOWER END OF IMAGE PLANE)

| LINE NUMBER | | OUTPUT OF SWITCH 13 | | LINE POSITION |
|---|---|---|---|---|
| $F_1$ | $F_2$ | $F_1$ | $F_2$ | |
| 22 | | $(A_1+A_2)/2$ | | 1 |
| | 285 | | $(A_3+A_4)/2$ | 2 |
| 23 | | $(A_5+A_6)/2$ | | 3 |
| | 286 | | $(A_7+A_8)/2$ | 4 |
| 24 | | $(A_9+A_{10})/2$ | | 5 |
| | 287 | | $(A_{11}+A_{12})/2$ | 6 |
| 25 | | $A_{13}$ | | 7 |
| | 288 | | $M-(A_1-A_2)/2$ | 8 |
| 26 | | $M+(A_1-A_2)/2$ | | 9 |
| | 289 | | $M-(A_3-A_4)/2$ | 10 |
| 27 | | $M+(A_3-A_4)/2$ | | 11 |
| | 290 | | $M-(A_5-A_6)/2$ | 12 |
| 28 | | $M+(A_5-A_6)/2$ | | 13 |
| | 291 | | $M-(A_7-A_8)/2$ | 14 |
| 29 | | $M+(A_7-A_8)/2$ | | 15 |
| | 292 | | $M-(A_9-A_{10})/2$ | 16 |
| 30 | | $M+(A_9-A_{10})/2$ | | 17 |
| | 293 | | $M-(A_{11}-A_{12})/2$ | 18 |
| 31 | | $M+(A_{11}-A_{12})/2$ | | 19 |
| | 294 | | MAIN | 20 |

UPPER END OF IMAGE PLANE

F I G. 11

ARRANGEMENT FOR PERMITTING MULTIPLEXING OF AN ADDITIONAL SIGNAL ON AN ENTIRE PORTION OF AN OVERSCANNING AREA OF A TELEVISION SIGNAL

BACKGROUND OF THE INVENTION

1. Field of the Invention

This invention relates to an additional signal multiplexing device for multiplexing an additional signal in a vertical overscanning area of a main signal, for example, and an additional signal separation device for separating the additional signal from the main signal on which the additional signal is superposed.

2. Description of the Related Art

As is well known in the art, in commercially available television receivers, an overscanning area is generally provided. That is, in a case where the whole size of the display image plane created by television signals is indicated by broken lines in FIG. 1, the actual display area of the television receiver is set to a slightly smaller size as shown by a solid line in FIG. 1. Therefore, an image on the peripheral portion of the entire display image plane area is omitted by the overscanning operation.

The reason why the overscanning area is provided is to prevent that the image plane is partly cut out by variation in the television signal receiving condition or the performance of the television receiver, thus making the viewers unpleasant.

However, in recent years, the performance of television receivers is enhanced and the operation thereof becomes stable, and the overscanning rate of 8% which is normally set can be satisfactorily attained with some margin. As a result, it has been proposed to transmit an additional signal by use of the overscanning area (refer to "STUDY ON TRANSMISSION SYSTEM FOR WIDE ASPECT IMAGE" in the technical report of television institute on Nov. 29, 1988, for example).

That is, a television signal includes 482 effective scanning lines for each frame in the vertical direction (in practice, 483 scanning lines are provided, but since one of them is used for multiplexed text broadcasting, 482 scanning lines can be effectively used), and $482 \times (8/100) = 38$ of the scanning lines are used for multiplexing new additional signals. Therefore, not the television signal but the additional signal is superposed on 19 ($=38/2$) of the 38 scanning lines which lie on each of the upper and lower portions of the image plane.

The above additional signal may include side panel components for increasing the width of the image plane (refer to "A Wide Screen EDTV" IEEE Transaction on Consumer Electronics, Vol. 35, No. 3, P.133-P.141, AUGUST 1989), high-definition components of the luminance signal Y and chrominance signal C (refer to "Extended Definition TV Fully Compatible with Existing Standard" IEEE Transactions on Communications, Vol. COM-32, No. 8, P.948-P.953, AUGUST 1984), and helper signals for sequential scanning/conversion (refer to "Encoding for Compatibility and Recoverability in the ACTV System" IEEE Transactions on Broadcasting, Vol. BC-33, No. 4, P.116-P.123, DECEMBER 1987).

However, when the additional signals are superposed on all of the 19 scanning lines on each of the upper and lower portions of the image plane, no margin can be taken for the overscanning in the vertical direction. As a result, when the central value in the vertical deflection is deviated, the image plane may be partly cut out as shown by a hatched portion in FIG. 2. In this case, the partial cut-out of the image plane also occurs when the vertical deflection amplitude is lowered and the raster is slightly narrowed in the vertical direction.

In view of the above fact, the number of scanning lines on which the additional signals are multiplexed on each of the upper and lower portions is limited to about 7 in the prior art so as to prevent the image plane from being partly cut out even when the vertical deflection center is deviated or the vertical deflection amplitude is lowered.

SUMMARY OF THE INVENTION

This invention has been made by taking the above fact into consideration, and an object of this invention is to provide an additional signal separation device and an additional signal multiplexing signal in which additional signals can be multiplexed on the entire portion of the vertical overscanning area without incurring the partial cut-out of the image plane due to deviation of the vertical deflection center or reduction in the vertical deflection amplitude.

According to one aspect of the present invention, there is provided an additional signal multiplexing device for multiplexing an additional signal on a television main signal, comprising a main signal outputting circuit for outputting a television main signal at a field repetition rate; an additional signal outputting circuit for inverting an additional signal for every other field and outputting the additional signal at the field repetition rate; and multiplexing circuit for multiplexing the television main signal output from the main signal outputting circuit on the additional signal output from the additional signal outputting circuit.

Another aspect of the present invention, there is provided an additional signal separation device for separating an additional signal from a multiplexed signal which is constructed by the television main signal obtained at a field repetition rate and the additional signal whose phase is inverted for every other field and which is obtained at the field repetition rate, comprising delay circuit for delaying the multiplexed signal by one field; and adding circuit for separating the additional signal by adding input and output signals of the delay circuit together.

BRIEF DESCRIPTION OF THE DRAWINGS

FIGS. 5 to 7A and 7B are diagrams for illustration of the operation of the additional signal multiplexing device shown in FIG. 3;

FIG. 11 is a diagram for illustration of the operation of the additional signal multiplexing device shown in FIG. 9.

DETAILED DESCRIPTION OF THE PREFERRED EMBODIMENTS

Figure 1:
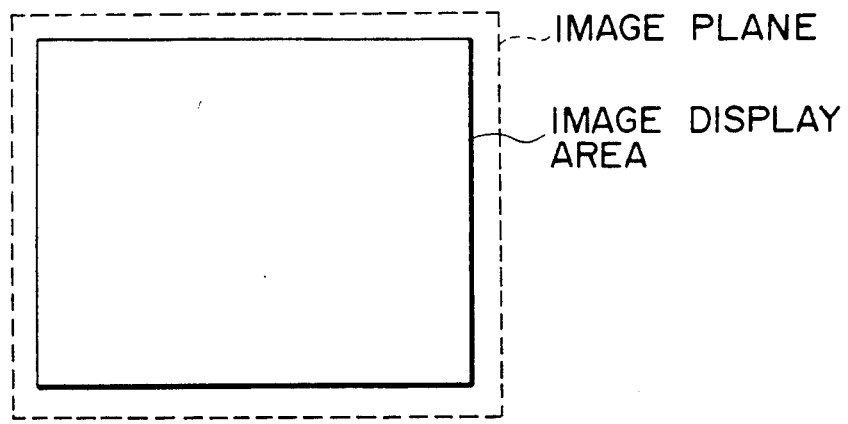
FIG. 1 is a diagram illustrating the overscanning area.
Figure 2:
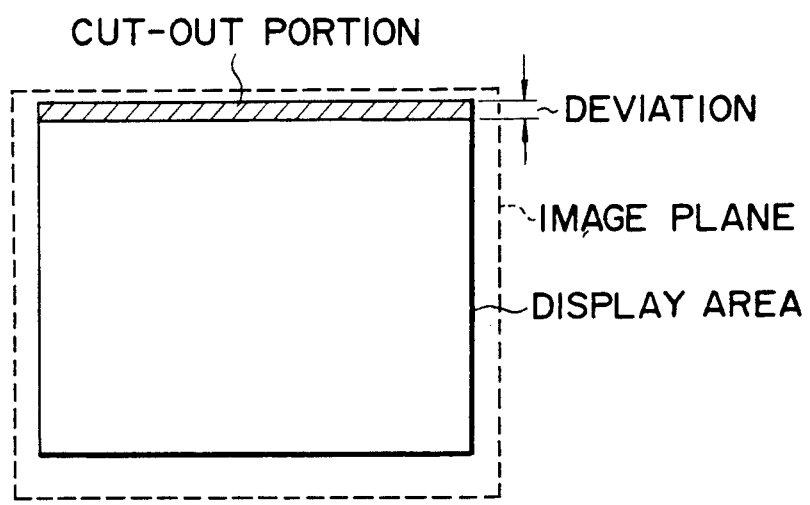
FIG. 2 is a diagram illustrating the partial cutout of an image plane occurring when the central value of the vertical deflection is deviated.
Figure 3:
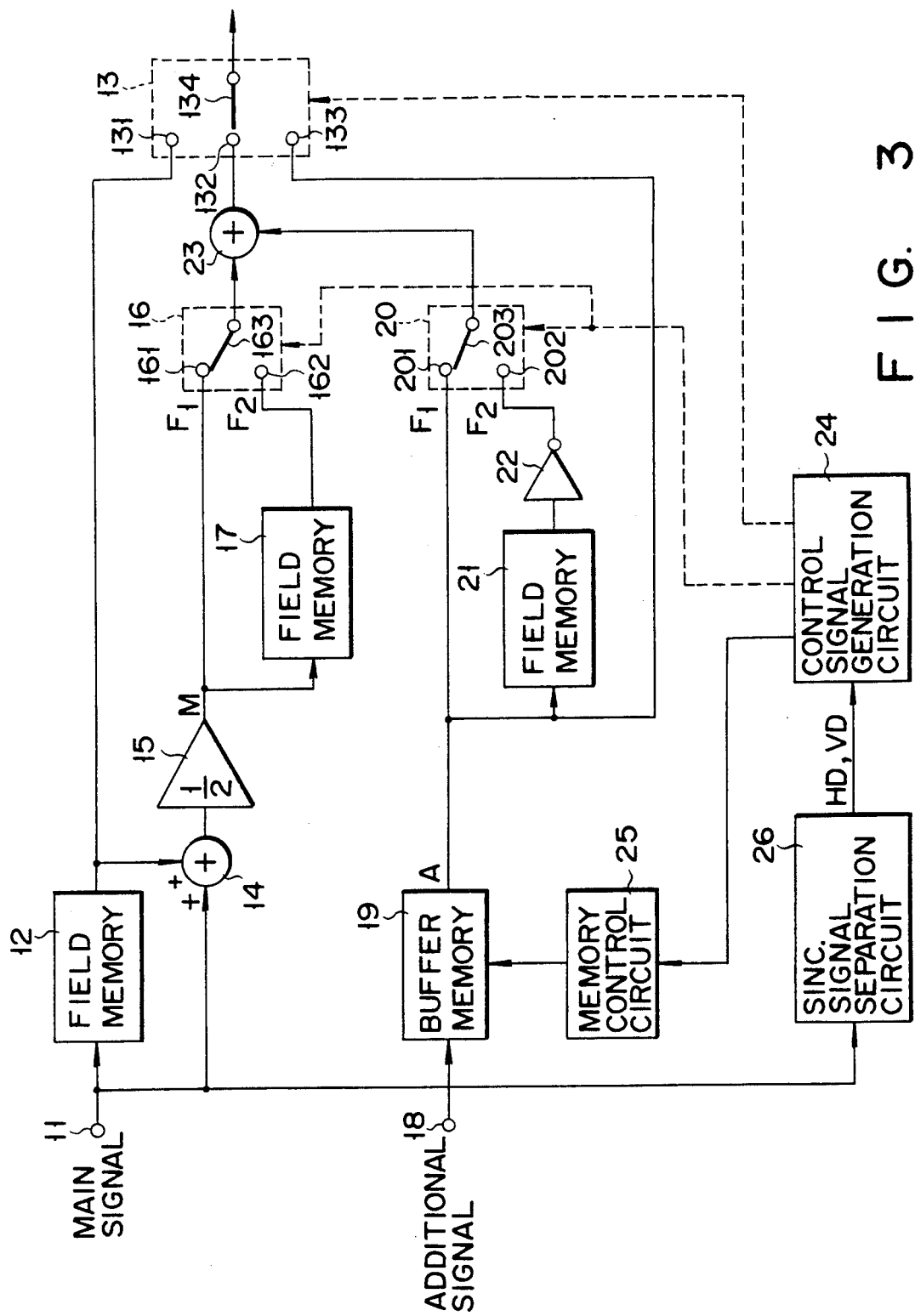
FIG. 3 is a block diagram showing the construction of one embodiment of an additional signal multiplexing device according to this invention.
Figure 4:
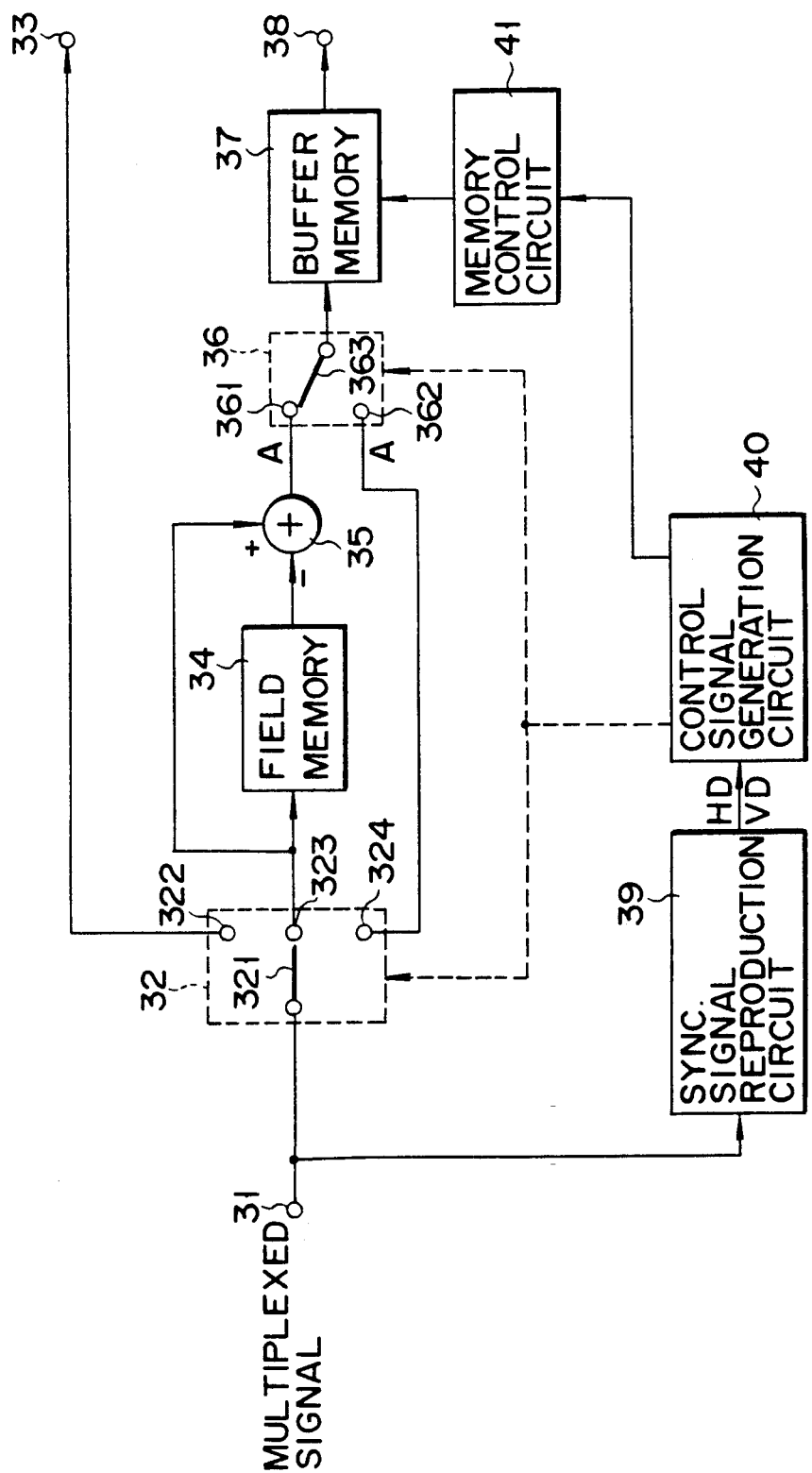
FIG. 4 is a block diagram showing the construction of one embodiment of an additional signal separation device according to this invention.

There will now be described an embodiment of this invention with reference to the accompanying drawings. FIG. 3 shows the construction of one embodiment of an additional signal multiplexing device according to this invention. Likewise, FIG. 4 shows the construction of one embodiment of an additional signal separation device according to this invention.

First, the additional signal multiplexing device shown in FIG. 3 is explained. In FIG. 3, a reference numeral 11 denotes an input terminal to which a main signal is input. The main signal input to the input terminal 11 is delayed by one field by means of a field memory 12 and then supplied to a fixed terminal 131 of a switch 13.

Input/output signals of the field memory 12 are added together by an adder circuit 14 and the output of the adder circuit 14 is multiplied by $\frac{1}{2}$ by means of a constant multiplier circuit 15. As a result, an intraframe average of the main signal or the average value of the main signal in the frame can be obtained. The main signal M thus averaged in the frame is supplied to the fixed terminal 161 of a switching circuit 16 and delayed by one field by means of a field memory 17. The output of the field memory 17 is supplied to a fixed terminal 162 of the switching circuit 16. A movable contact 163 of the switching circuit 16 is connected to the fixed terminal 161 in the first field $F_1$ in the frame and to the fixed terminal 162 in the second field $F_2$.

A reference numeral 18 denotes an input terminal to which an additional signal is input. The additional signal input to the input terminal 18 is written into a buffer memory 19 and then read out at a preset timing. The additional signal A read out from the buffer memory 19 is supplied to the fixed terminal 201 of a switching circuit 20 and delayed by one field by means of a field memory 21. The delayed output is phase-inverted by a phase-inverting circuit 22 and then supplied to a fixed terminal 202 of the switching circuit 20. A movable contact 203 of the switching circuit 20 is connected to the fixed terminal 201 in the first field $F_1$ in the frame and to the fixed terminal 202 in the second field $F_2$.

The selected output from the switching circuit 20 is added to the selected output from the switching circuit 16 by an adder circuit 23 and the output of the adder circuit 23 is supplied to the fixed terminal 132 of a switching circuit 13. A fixed terminal 133 of the switching circuit 13 is supplied with the additional signal A read out from the buffer memory 19.

Figure 5:
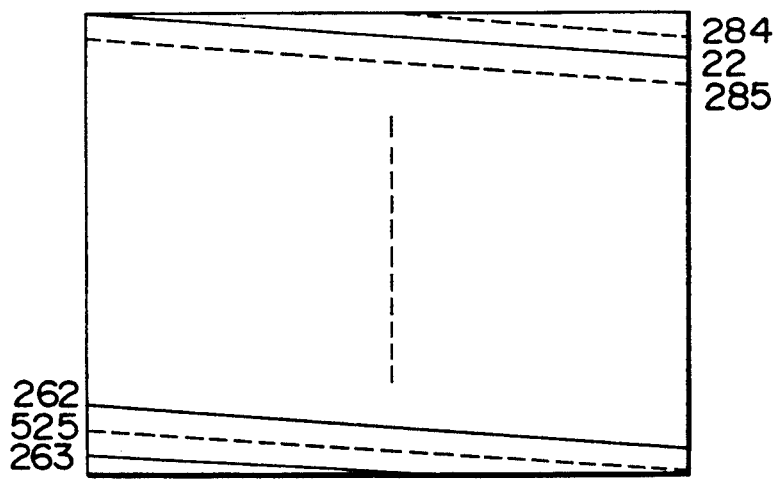

Connection of a movable contact 134 of the switching circuit 13 is controlled as described below. Assume now that the effective scanning period is expressed by line numbers. Then, as shown by solid lines in FIG. 5, the first field $F_1$ ranges from 22 to 262, and as shown by broken lines in FIG. 5, the second field $F_2$ ranges from 285 to 525. Likewise, the overscanning area ranges from 22 to 31 in the upper portion of an image plane of the first field $F_1$ and from 254 to 262 in the lower portion of the image plane. Further, the overscanning area ranges from 285 to 293 in the upper portion of an image plane of the second field $F_2$ and from 516 to 525 in the lower portion of the image plane.

With the above format, the movable contact 134 of the switching circuit 13 is connected to the fixed terminal 133 in the range from the top line of the image plane to the seventh line (the line numbers from 22 to 25 and from 285 to 287) for each frame and in the range from the bottom line to the seventh line (the line numbers from 260 to 262 and from 522 to 525). Further, the movable contact 134 of the switching circuit 13 is connected to the fixed terminal 132 in the range from the eighth line from the upper end of the image plane to the nineteenth line (the line numbers from 26 to 31 and from 288 to 293) for each frame and in the range from the eighth line from the lower end of the image plane to the nineteenth line (the line numbers from 254 to 259 and from 516 to 521). The movable contact 134 of the switching circuit 13 is connected to the fixed terminal 131 in the other range, that is, in a range other than the overscanning area.

A control signal for controlling the switching positions of the switching circuits 13, 16 and 20 is output from a control signal generation circuit 24. The control signal generation circuit 24 also generates a control signal for accessing the buffer memory 19. The operation of writing or reading the additional signal A with respect to the buffer memory 19 is controlled by a memory control circuit 25 which is driven by the above control signal. Further, the control signal generation circuit 24 generates various control signals according to a horizontal sync. signal HD or vertical sync. signal VD separated from the main signal by a sync. signal separation circuit 26.

Figure 6:
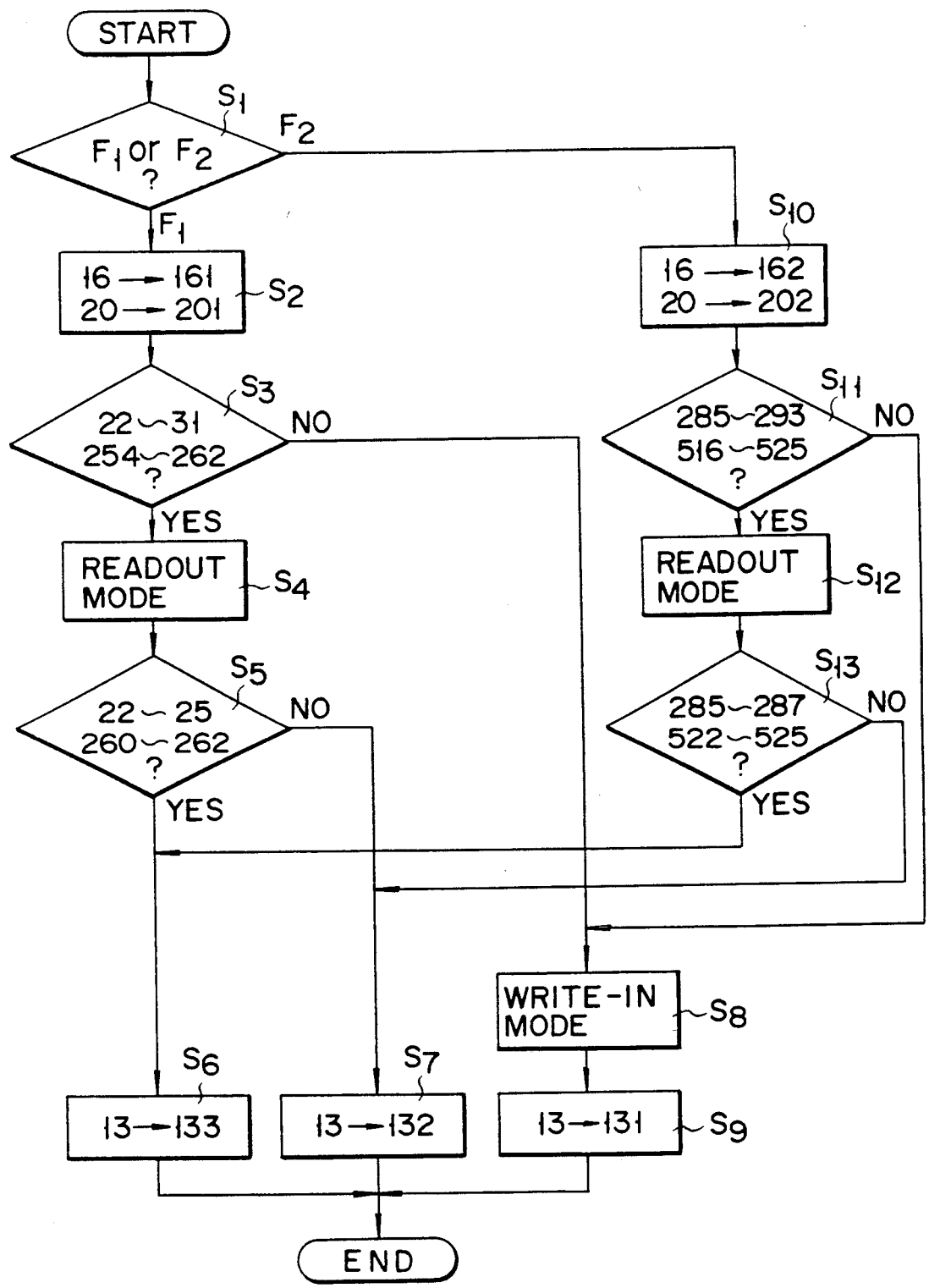

Now, the operation of the circuit with the above construction is explained with reference to FIGS. 6, 7A and 7B. FIG. 6 is a flowchart showing the control operation of the control signal generation circuit 24 for controlling the switching circuits 13, 16 and 20 and the buffer memory 19. Further, FIGS. 7A and 7B are diagrams showing an output of the switching circuit 13. As shown in FIG. 6, it is checked in the step $S_1$ whether the field is the first field $F_1$ or second field $F_2$. If it is determined that the field is the first field $F_1$, the movable contacts 163 and 203 of the switching circuits 16 and 20 are respectively connected to the fixed terminals 161 and 201 in the step $S_2$.

In the next step $S_3$, it is checked whether or not the line number lies in the range of 22 to 31 or 254 to 262. If it is determined that the line number lies in the above range, the additional signal A is read out from the buffer memory 18 in the step $S_4$. In the next step $S_5$, it is checked whether or not the line number lies in the range of 22 to 25 or 260 to 262. If it is determined that the line number lies in the above range, the movable contact 134 of the switching circuit 13 is connected to the fixed terminal 133 in the next step $S_6$. As a result, as shown in FIGS. 7A and 7B, the additional signal A read out from the buffer memory 19 is output from the switching circuit 13.

Further, if it is determined in the step $S_5$ that the line number does not lie in the above range, that is, if it is determined that the line number lies in the range of 26 to 31 or 254 to 259, the movable contact 134 of the switching circuit 13 is connected to the fixed terminal 132 in the step $S_7$. In this case, as shown in FIGS. 7A and 7B, the sum signal of the main signal M and additional signal A is output from the switching circuit 13.

Further, if it is determined in the step $S_3$ that the line number does not lie in the above range, that is, if the line number lies outside the vertical overscanning area, the movable contact 134 of the switching circuit 13 is connected to the fixed terminal 131 in the step $S_9$ after the buffer memory 19 is set into the write-in mode in the step $S_8$. As a result, in this case, the main signal supplied from the field memory 12 is output from the switching circuit 13. The content of the buffer memory 19 is rewritten in the vertical blanking period, for example.

When it is determined in the step $S_1$ that the field is the second $F_2$, the process is effected according to the steps $S_{10}$ to $S_{13}$. The process effected according to the steps $S_{10}$ to $S_{13}$ is substantially the same as that effected for the first field $F_1$ according to the steps $S_2$ to $S_5$, and the explanation therefor is omitted.

As is clearly understood from the above-description, the additional signal A read out from the buffer memory 19 is output from the switching circuit 16 in the range from the upper end of the image plane to the seventh line and from the lower end to the seventh line of each frame irrespective that the field is the first field $F_1$ or second field $F_2$ as shown in FIGS. 7A and 7B. Further, since the main signal M is output at the field repetition rate in the range from the eighth line from the upper end to the nineteenth line and from the eighth line from the lower end to the nineteenth line for each frame and the additional signal A is output at the field repetition rate after the phase of the additional signal A is inverted in every other field, a sum signal (M+A) is output in the first field $F_1$ and a difference signal (M−A) is output in the second field $F_2$. In a range other than the above range, that is, in an area other than the overscanning area, the main signal output from the field memory 12 is output.

Next, the additional signal separation device shown in FIG. 4 is explained. In FIG. 4, a reference numeral 31 denotes an input terminal to which a multiplexed signal is input. The multiplexed signal input to the input terminal 31 is supplied to an output terminal 33 via a switching circuit 32 when the movable contact 321 of the switching circuit 32 is connected to a fixed terminal 322. On the other hand, the multiplexed signal is supplied to the fixed terminal 361 of a switching circuit 36 after an inter-field difference or a difference between the fields is derived by means of an inter-field difference circuit constructed by a field memory 34 and an addition circuit 35 when the movable contact 321 is connected to the fixed terminal 323. Further, when the movable contact 321 is connected to a fixed terminal 324, the multiplexed signal is supplied to the fixed terminal 362 of a switching circuit 36 via the switching circuit 32. The selected output of the switching circuit 36 is supplied to a buffer memory 37 via the movable contact 363, stored therein output from the output terminal 38.

Further, a reference numeral 39 denotes a sync. signal reproducing circuit for reproducing a horizontal sync. signal HD and vertical sync. signal VD in synchronism with the multiplexed signal supplied to the input terminal 31. A reference numeral 40 denotes a control signal generation circuit for generating control signals for controlling the switching positions of the switching circuits 32 and 36 and a control signal for controlling the access to the buffer memory 37 according to the reproduced output from the sync. signal reproducing circuit 39. Further, a reference numeral 41 denotes a memory control circuit for controlling the write-in/readout operation of the buffer memory 37 according to a control signal output from the control signal generation circuit 40.

Figure 8:
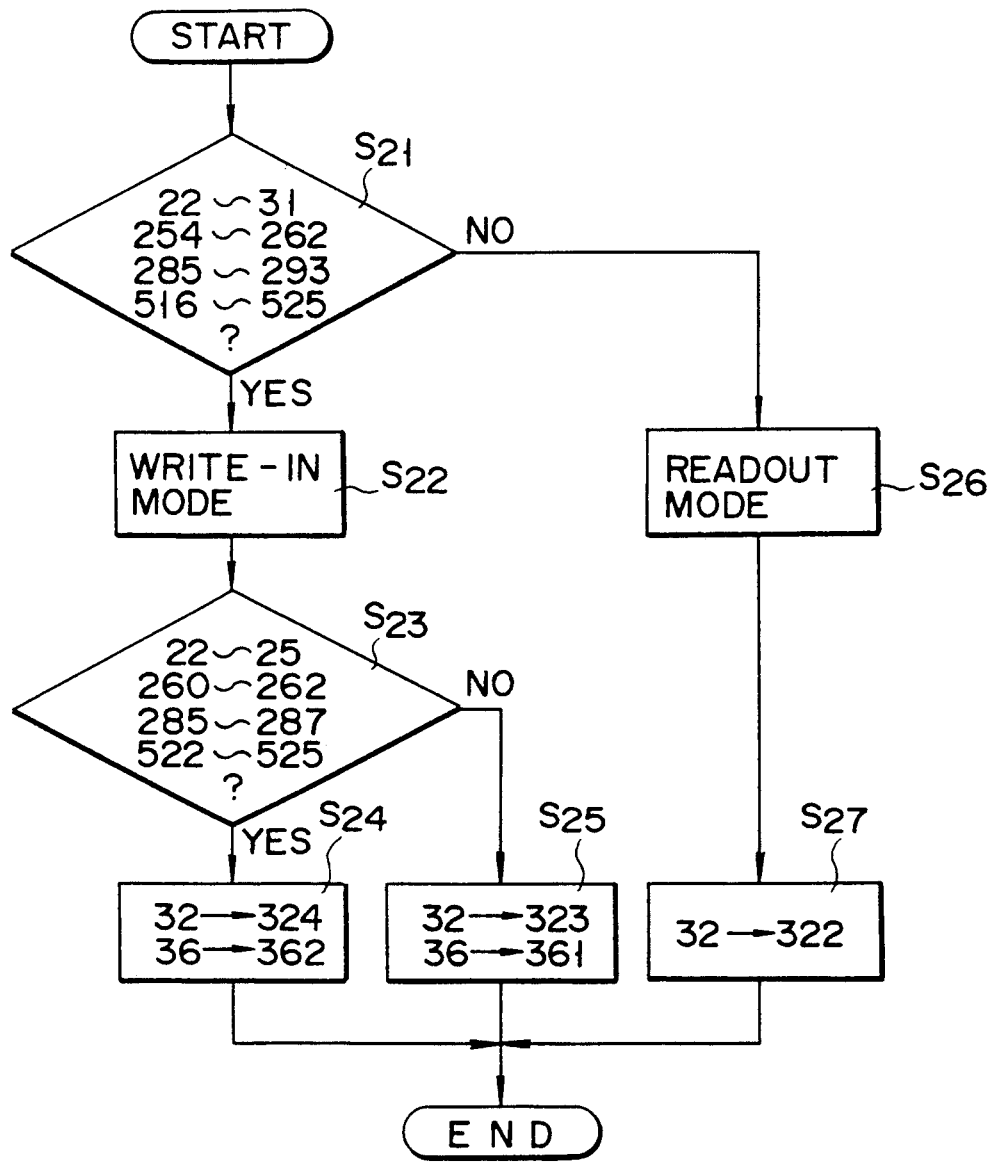
FIG. 8 is a flowchart for illustration of the additional signal separation device shown in FIG. 4.

The operation of the circuit with the above construction is explained with reference to FIG. 8. FIG. 8 is a flowchart showing the control operation of the control signal generation circuit 40 for controlling the switching circuits 32 and 36 and buffer memory 37. That is, it is checked in the step $S_{21}$ whether or not the line number lies in the range of 22 to 31, 254 to 262, 285 to 293 or 516 to 525. When the line number lies in the above range, the buffer memory 37 is set into the write-in mode in the step $S_{22}$. After this, it is checked in the step $S_{23}$ whether or not the line number lies in the range of 22 to 25, 260 to 262, 285 to 287 or 522 to 525. When the line number lies in the above range, the movable contacts 321 and 363 of the switching circuits 32 and 36 are respectively connected to the fixed terminals 324 and 362 in the step $S_{24}$. As a result, as shown in FIGS. 7A and 7B, the additional signal A lying in the range from the upper end of the image plane to the seventh line and from the lower end to the seventh line for each frame is written into the buffer memory 37.

If it is determined in the step $S_{23}$ that the line number does not lie in the above range, that is, if the line number lies in the range of 26 to 31, 254 to 259, 288 to 293 or 516 to 521, the step $S_{25}$ is effected to connect the movable contacts 321 and 363 of the switching circuits 32 and 36 to the fixed terminals 323 and 361. As a result, a difference between the sum signal (M+A) in the first field $F_1$ and the difference signal (M−A) in the second field $F_2$ shown in FIGS. 7A and 7B is derived by means of the field memory 34 and addition circuit 35, thus reproducing the additional signal A. The reproduced additional signal A is written into the buffer memory 37 via the switching circuit 36.

If it is determined in the step $S_{21}$ that the line number does not lie in the above range, the buffer memory 37 is set into the readout mode in the step $S_{26}$. After this, in the step $S_{27}$, the movable contact 321 of the switching circuit 32 is connected to the fixed terminal 322. As a result, the main signal lying in an area other than the vertical overscanning area is output from the output terminal 33 via the switching circuit 32.

As described above, in this embodiment, the main signal M is output at the field repetition rate and the additional signal A is output at the field repetition rate after the phase thereof is inverted in every other field. Unlike the conventional case in which only the main signal M is superposed in an area of the image plane from the seventh line from the upper end to the nineteenth line and from the seventh line from the lower end to the nineteenth line, the additional signal A is also superposed in this embodiment. Therefore, according to this embodiment, the additional signal A can be multiplexed in the entire range of the vertical scanning area without incurring the partial cut-out of the image plane due to deviation in the center of the vertical deflection or reduction in the vertical deflection amplitude. Further, in this embodiment, since the main signal M is output at the field repetition rate and the additional signal A is output at the field repetition rate after the phase of the additional signal A is inverted in every other field, it is possible to easily separate the additional signal A by taking an interfield difference.

Further, in this embodiment, since the average of the main signal in the frame derived by means of a low-pass filter constituted by the field memory 12 and adder circuit 14 is used as the main signal M, occurrence of an unnatural image due to the field repetition in the mobile area can be prevented.

Figure 9:
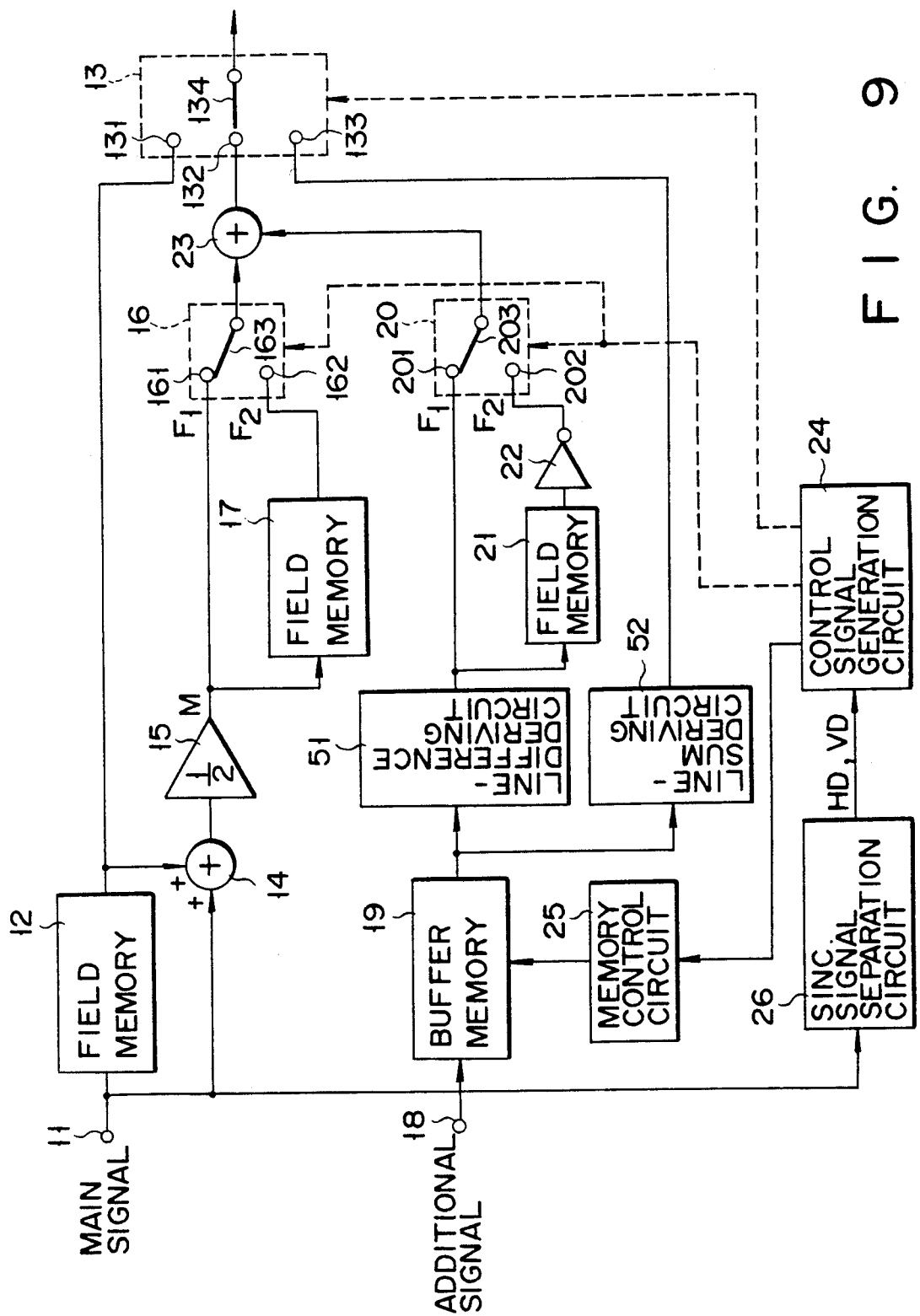
FIG. 9 is a block diagram showing the construction of another embodiment of an additional signal multiplexing device according to this invention.
Figure 10:
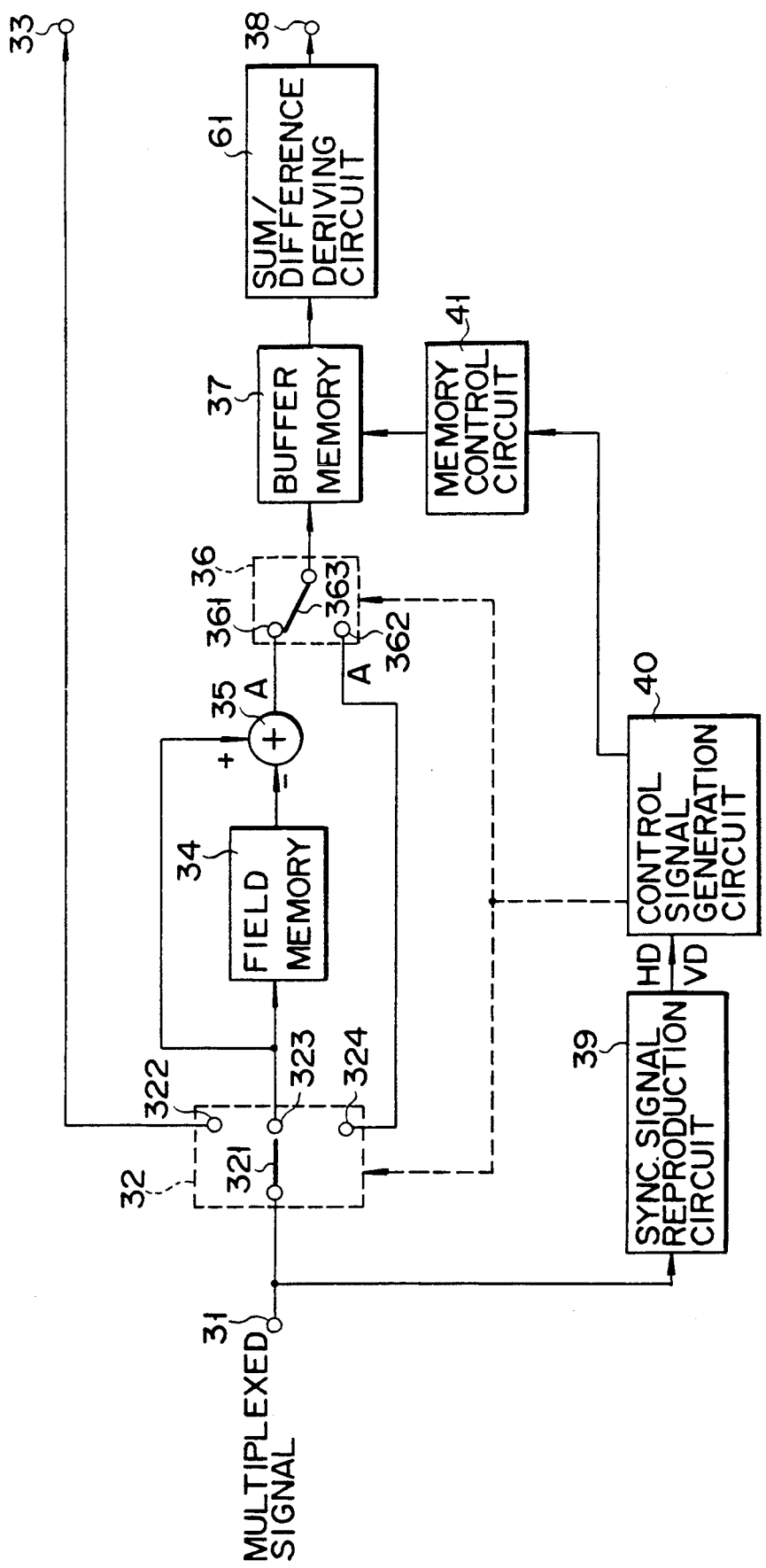
FIG. 10 is a block diagram showing the construction of another embodiment of an additional signal separation device according to this invention.

FIG. 9 shows the construction of another embodiment of an additional signal multiplexing device according to this invention. Likewise, FIG. 10 shows the construction of another embodiment of an additional signal separation device according to this invention. In FIGS. 9 and 10, portions which are the same as those shown in FIGS. 3 and 4 are denoted by the same reference numerals.

First, the additional signal multiplexing device shown in FIG. 9 is explained. In the embodiment shown in FIG. 3, the additional signal A read out from the buffer memory 19 is multiplexed as it is. In contrast, in this embodiment of FIG. 9, a line-difference deriving circuit 51 and a line-sum deriving circuit 52 are connected at the output stage of the buffer memory 19. As shown in FIG. 11, the line-sum average output $(A_{2n-1}+A_{2n})/2$ output from the line-sum deriving circuit 52 is multiplexed in the range from the upper end to the sixth line for each frame, the additional signal $A_{13}$ of the thirteenth line is multiplexed as it is via the line-sum deriving circuit 52 in the seventh line, and the line-difference average output $(A_{2n-1}-A_{2n})/2$ output from the line-difference deriving circuit 51 is multiplexed at the field repetition rate in the range from the eighth line to the nineteenth line. In this case, the readout operation of the buffer memory 19 is effected so that the line-difference outputs for signals on those lines which are the same as the lines multiplexed on the first to the sixth lines can be multiplexed at the field repetition rate in the range from the eighth line to the nineteenth line.

In the case of effecting the above multiplexing operation, the additional signals $A_{2n-1}$ and $A_{2n}$ can be reproduced by effecting the addition and subtraction operations in a period of 8 H (1 H is one horizontal scanning period).

That is, the additional signals $A_{2n-1}$ and $A_{2n}$ can be reproduced by connecting a sum/difference deriving circuit 61 at the output stage of the buffer memory 37 as shown in FIG. 10 and deriving the sum of and difference between two outputs which are read out from the buffer memory 37 and are separated from each other by 8 H. However, the additional signal $A_{13}$ can be obtained by outputting a readout output on the seventh line as it is.

Substantially the same multiplexing operation can be effected for the lower portion of the image plane although not explained in detail.

With the above construction, the same effect as that obtained in the former embodiment can be obtained. Further, since the line-difference outputs of the additional signals A are multiplexed in the range from the eighth line from the upper end of the image plane to the nineteenth line and from the eighth line from the lower end to the nineteenth line, the average power of the additional signals A to be multiplexed can be reduced if the additional signals A have the vertical correlation. As a result, even if the image plane from the eighth line to the nineteenth line is displayed as the result of deviation in the vertical deflection center, visual influence by the additional signals A can be suppressed.

Further, since additional signals A for 13 lines can be multiplexed on each of the upper and lower portions of the image plane for each frame when the above-described multiplexing operation is effected, additional signals A of the same amount as that in the former embodiment can be multiplexed.

Two embodiments of this invention have been explained in detail. However, this invention is not limited to the above two embodiments. For example, in the embodiment of FIG. 3, the additional signals A are multiplexed on the eighth line to the nineteenth line from each of the upper end and lower end of the image plane for each frame. However, the range in which the additional signals A are multiplexed is not limited to the above range, and it is possible to multiplex the additional signal A in the range in which the main signal is superposed. Further, in the embodiment of FIG. 3, the average signal M of the main signal in the frame is multiplexed at the field repetition rate. However, it is possible to multiplex the main signal as it is at the field repetition rate.

Additional advantages and modifications will readily occur to those skilled in the art. Therefore, the invention in its broader aspects is not limited to the specific details, and representative devices, shown and described herein. Accordingly, various modifications may be made without departing form the spirit or scope of the general inventive concept as defined by the appended claims and their equivalents.

What is claimed is:

1. An additional signal multiplexing device for multiplexing an additional signal on a television main signal, comprising:

main signal outputting means for outputting the television main signal at the field repetition rate;

additional signal outputting means for inverting the additional signal for every other field and outputting the additional signal;

multiplexing means for multiplexing the television main signal output from said main signal outputting means and the additional signal output from said additional signal outputting means on each other; and multiplexing control means for multiplexing the multiplexed signal output from said multiplexing means on scanning lines in a vertical overscanning area of the television main signal and multiplexing the television main signal on scanning lines outside the vertical overscanning area.

2. The additional signal multiplexing device according to claim 1, wherein said multiplexing control means multiplexes the additional signal on a plurality of scanning lines near the upper and lower ends of the vertical scanning area and multiplexes the multiplexed signal on a plurality of scanning lines near an actual image display area of the vertical scanning area.

3. The additional signal multiplexing device according to claim 1, further comprising intra-frame averaging means for deriving the intra-frame average of the television main signal supplied to said main signal outputting means.

4. The additional signal multiplexing device according to claim 3, wherein said intra-frame averaging means includes delay means for delaying the television main signal by one field, adding means for adding input and output signals of said delay means together, and constant multiplier means for multiplying an output of said adding means by $\frac{1}{2}$.

5. The additional signal multiplexing device according to claim 1, further comprising line-sum deriving means for deriving the average of the line-sums of the additional signals supplied to said additional signal outputting means, and line-difference deriving means for deriving the average of the line-difference of the additional signals supplied to said additional signal outputting means.

6. The additional signal multiplexing device according to claim 5, wherein said multiplexing control means multiplexes an output signal of said line-sum deriving means on a plurality of scanning lines near the upper and lower ends of the vertical scanning area and multiplexes an output signal of said line-difference deriving means on a plurality of scanning lines near an actual image display area of the vertical scanning area.

7. An additional signal separation device for receiving an input signal on a part of which is superposed a multiplexed signal including both a television main signal obtained at a field repetition rate and an additional signal whose phase is inverted for every field, and on a remaining part of which said television main signal is superposed, and for separating said additional signal from said input signal, said part corresponding to scanning lines which are in a vertical overscanning area, said remaining part corresponding to scanning lines which are outside of said vertical overscanning area, said device comprising:

separation control means for separating from said input signal the multiplexed signal superposed on said part and the television main signal superposed on said remaining part;

delay means, to which the multiplexed signal separated from said input signal by said separation control means is input, for delaying the multiplexed signal as input thereto by one field; and subtraction means, to which the multiplexed signal separated from said input signal by said separation control mean is input, for subtracting from the multiplexed signal as input thereto the multiplexed signal delayed by said delay means, to thereby separate said additional signal from the multiplexed signal which is separated from said input signal.

8. An additional signal separation device according to claim 7, further comprising sum/difference deriving means for deriving the sum of and the difference between those two lines of outputs of said adding means which are set apart from each other by 8 H.

* * * * *